(12) United States Patent
Becoulet et al.

(10) Patent No.: US 11,643,975 B2
(45) Date of Patent: May 9, 2023

(54) SPEED REDUCER OF A TURBOMACHINE

(71) Applicant: SAFRAN AIRCRAFT ENGINES, Paris (FR)

(72) Inventors: Julien Fabien Patrick Becoulet, Moissy-Cramayel (FR); Emmanuel Fabrice Marie Baret, Moissy-Cramayel (FR); Franck Emmanuel Bosco, Moissy-Cramayel (FR); Michel Gilbert Roland Brault, Moissy-Cramayel (FR); Paul Ghislain Albert Levisse, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/603,655

(22) PCT Filed: Apr. 17, 2020

(86) PCT No.: PCT/FR2020/000136
§ 371 (c)(1),
(2) Date: Oct. 14, 2021

(87) PCT Pub. No.: WO2020/212666
PCT Pub. Date: Oct. 22, 2020

(65) Prior Publication Data
US 2022/0235711 A1    Jul. 28, 2022

(30) Foreign Application Priority Data

Apr. 19, 2019   (FR) ........................................ 1904224

(51) Int. Cl.
*F16H 57/04*   (2010.01)
*F02C 7/36*    (2006.01)
(Continued)

(52) U.S. Cl.
CPC ................ *F02C 7/36* (2013.01); *F01D 25/18* (2013.01); *F02C 7/06* (2013.01); *F16H 57/0479* (2013.01);
(Continued)

(58) Field of Classification Search
CPC .... F02C 7/36; F16H 57/0479; F16H 57/0486; F16H 57/082
See application file for complete search history.

(56) References Cited

U.S. PATENT DOCUMENTS

| 4,541,737 A | * | 9/1985 | White | F16N 7/16 |
| | | | | 384/406 |
| 2005/0026745 A1 | * | 2/2005 | Mitrovic | F16H 1/2836 |
| | | | | 475/348 |

(Continued)

FOREIGN PATENT DOCUMENTS

| EP | 3 453 924 A1 | 3/2019 |
| FR | 2 987 417 A1 | 8/2013 |

(Continued)

OTHER PUBLICATIONS

English translation of Written Opinion dated Jul. 27, 2020, issued in corresponding International Application No. PCT/FR2020/000136, filed Apr. 17, 2020, 5 pages.
(Continued)

*Primary Examiner* — Derek D Knight
(74) *Attorney, Agent, or Firm* — Christensen O'Connor Johnson Kindness PLLC

(57) ABSTRACT

A speed reducer, particularly of an aircraft, includes a central sun gear mounted to rotate with a drive shaft about a rotation axis X, an annular ring gear coaxial with the X axis, and a plurality of planet gears arranged about the X axis and mounted to be movable on a planet carrier. The planet gears engages the sun gear and the annular ring gear, which (Continued)

extends around the planet gears. The speed reducer further includes a lubricant recovery device having a pipe for recovering lubricant discharged from the reducer by centrifuging. The recovery device has scoops mounted to pivot about a pivot axis P on a movable member of the speed reducer that rotates about the X axis between a deployed state and a rest state.

15 Claims, 5 Drawing Sheets

(51) Int. Cl.
    *F01D 25/18*      (2006.01)
    *F02C 7/06*      (2006.01)
    *F16H 57/08*      (2006.01)

(52) U.S. Cl.
    CPC ....... *F16H 57/0486* (2013.01); *F16H 57/082* (2013.01); *F05D 2220/323* (2013.01); *F05D 2240/60* (2013.01); *F05D 2260/40311* (2013.01); *F05D 2260/98* (2013.01)

(56) References Cited

U.S. PATENT DOCUMENTS

2015/0354407 A1* 12/2015 Anglin ............... F16D 43/16
                                                                                    188/82.77
2019/0078680 A1* 3/2019 Edwards ............. F16N 7/363

FOREIGN PATENT DOCUMENTS

| FR | 3 065 268 A1 | 10/2018 |
|---|---|---|
| GB | 947789 | 1/1964 |
| WO | 2013/124590 A1 | 8/2013 |

OTHER PUBLICATIONS

International Preliminary Report on Patentability dated Sep. 28, 2021, issued in corresponding International Application No. PCT/FR2020/000136, filed Apr. 17, 2020, 7 pages.

International Search Report dated Jul. 27, 2020, issued in corresponding International Application No. PCT/FR2020/000136, filed Apr. 17, 2020, 6 pages.

Written Opinion dated Jul. 27, 2020, issued in corresponding International Application No. PCT/FR2020/000136, filed Apr. 17, 2020, 6 pages.

* cited by examiner

SPEED REDUCER OF A TURBOMACHINE

TECHNICAL FIELD

The present disclosure relates to the field of the speed reducers for turbomachine, in particular for aircraft.

BACKGROUND

The prior art comprises in particular the document EP-A1-3453924.

The current turbomachines, in particular the turbojet or turboprop engines comprising one or more propellers or fans generating a primary flow and a secondary flow, comprise a transmission system, referred to as reducer. This reducer drives this propeller or these propellers or fan at the right rotation speed from the shaft of the low pressure turbine of the primary body of the turbomachine, while taking into account their particular architectures (such as the dilution ratio).

The operation of the reducers, in particular on turbojet engines with high dilution ratio fan, requires a particularly large flow rate of lubricant or lubricating oil to ensure the lubrication and the cooling of the various members thereof such as their pinions and bearings, as well as the dissipation of a large amount of power. The flow rate of the lubricant is a function of the architecture and is, for example, of the order of 6000 to 7000 liters per hour at take-off for a particular architecture.

Among the reducers used, we find planetary gears and epicyclic gears (also referred to as reduction gear box or RGB). Such reducers comprise a planetary pinion or central pinion (referred to as sun gear), an outer ring gear (or outer planetary) and planet gear pinions (called planet gears) which are mounted on a planet carrier and which engages with the sun gear and with the ring gear. One of these components must be locked in rotation for the gear train to operate.

When the planet carrier is fixed in rotation, the sun gear and the ring gear are leading and led, respectively, or vice versa. The reducer is then of the "planetary gear" type. In the opposite case a reducer of the "epicyclic gear" type, the outer ring gear is fixed in rotation and the sun gear and the planet carrier are driving and driven.

Such reducers are typically arranged between a fan and a low pressure (LP) compressor belonging to the primary body of the turbomachine. The advantage of these reducers is that they offer high reduction ratios, allowing the speed of the fan and the low-pressure turbine to be adapted independently, so that their use can be optimized.

However, this type of reducer has its disadvantages. One of the problems is the proper lubrication of the toothing of the pinions and the bearings. In view of the high power flowing through the reducer, a poor lubrication of the latter can lead to a degradation of the performance or a damage of the reducer.

It is known from the prior art a device for recovering lubricating oil from a reducer of the epicyclic gear type, as described in the document WO-A1-2013/124590, comprising guiding and deflecting means of the oil by centrifugation towards the gears of the reducer and extending around a stationary ring gear. These means consist of two symmetrical recovery gutters of the oil which are stationary, which go around the reducer and which end at a point on the circumference with two scoops turning away from the gutter to discharge the collected oil. This latter is returned to the main tank of the engine. This device is adapted to lubricate only a reducer of the epicyclic gear type and operating at high-speed. It cannot therefore be used to cover the other operating conditions, in particular when the turbomachine is at a standstill, during start-up, or when the fan shaft is rotating freely at low speed in a clockwise or counter-clockwise direction (phase referred to as "WindMilling"). In the case of the WindMilling, the fan shaft rotates under the effect of the wind, and drives the reducer and the turbine shaft of the turbomachine.

An auxiliary lubrication of the reducer at standstill or running at low speed has been proposed to preserve the components of the reducer. Pumps of lubrication and transfer of the lubricant can be used to ensure this auxiliary lubrication function. However, they have the disadvantage of requiring a complicated and bulky mounting.

In this context, it is interesting to overcome the disadvantages of the prior art, by proposing a lubrication solution for a speed reducer covering in particular the cases of low speed operation, while preserving the components of the reducer.

SUMMARY

Embodiments of the disclosure thus proposes a speed reducer of a turbomachine, in particular of an aircraft, comprising a central sun gear mounted integral in rotation on a power shaft around an axis X of rotation, an annular ring gear coaxial with the axis X and a plurality of planet gears arranged around the axis X and movably mounted on a planet carrier, the planet gears being meshed with the sun gear and the annular ring gear which extends around the planet gears, the speed reducer further comprising a lubricant recovery device comprising a recovering pipe of lubricant discharged by centrifugation from the reducer.

The recovery device according to the disclosure comprises scoops mounted so as to pivot about a pivot axis P on a movable member of the speed reducer which rotates around the axis X between, on the one hand, a deployed state when the power shaft of the reducer rotates at a first predetermined speed and in which each scoop is configured to recover a portion of the lubricant by moving toward the pipe, and on the other hand, a rest state when the power shaft of the reducer rotates at a second predetermined speed greater than the first predetermined speed.

According to the disclosure, the movable member is the annular ring gear.

Thus, this solution allows to achieve the above-mentioned objective. The disclosure proposes to integrate a lubrication device comprising movable scoops and mounted on the movable member. These scoops are deployed, especially at low speed, to recover the stagnant lubricant at the bottom of the recovery pipe and to return the lubricant, due to the gravity, to the top of the reducer in order to redistribute the collected lubricant to the gears of the same reducer. At high speeds, these movable scoops are at rest (i.e. not functional) and do not brake the circulation of the lubricant (no churning in particular) in the recovery pipe. This auxiliary device for passively lubricating the speed reducer is particularly adapted to the low-speed operation (such as during WindMilling, standstill or start-up), speed operation for which the oil requirements are relatively low, i.e. approx. 100 liters per hour. This lubrication device also allows to eliminate the need for an additional generator or an additional pump in the turbomachine. This speed reducer allows to improve, in a simple and effective way, the lubrication within the speed reducer operating at low speed and high speed while avoiding cluttering up the reducer.

The pinions of the planet gears, of the ring gear, and of the sun gear form the gears of the reducer.

According to another embodiment, the speed reducer is a planetary gear, and in that the planet carrier is stationary.

According to another embodiment, the recovery device comprises a gutter which extends radially outwards and at least partly around the ring gear, the pipe being carried by the gutter and extending at least partly circumferentially around the axis X.

According to another embodiment, the pipe is in fluid communication with the gutter at the level of a first position substantially at the bottom of the reducer and remote from the axis X of the reducer so as to store lubricant.

In the present application, the rotation of the scoops around the axis X is comparable to the counterclockwise rotation. Thus, advantageously, each scoop is configured to rotate around the axis X from a first position (equivalent to 6 o'clock) located substantially at the bottom of the reducer and distant from the central sun gear, to a third position (equivalent to 3 o'clock) and distant from the sun gear, then to a second position (equivalent to 12 o'clock) located substantially at the top of the reducer and opposite to the first position, and finally to a fourth position (equivalent to 9 o'clock) opposite to the third position.

According to another embodiment, the recovery device further comprises at least one delivering channel of the lubricant which is carried by the planet carrier and which extends, at least partly circumferentially around the axis X, between a second position opposite the first position and a third position arranged between the first and second positions, the channel being intended to receive the lubricant from the scoops and opens substantially to the gears of the reducer.

According to another embodiment, the delivery channel of the lubricant extends, at least partly circumferentially around the axis X, between the first position and the second position.

According to another embodiment, in its deployed state each scoop is configured, on the one hand, to recover the lubricant from the pipe from the first position, and on the other hand, to redirect the recovered lubricant in the delivery channel all along the third position, towards the second position.

According to another embodiment, the channel comprises a distribution member comprising an injector which is arranged substantially at the level of the third position substantially downstream of the reducer and remote from the sun gear, the injector being configured to inject the lubricant flowing in the channel and discharged by the scoops towards the gears of the reducer.

According to another embodiment, each scoop comprises a balancing member configured to tilt the scoop from the deployed state to the rest state or vice versa under the action of a centrifugal force generated during the rotation of the axis X.

According to another embodiment, each scoop comprises a return member configured to maintain the scoop in its deployed state.

In this configuration, the balancing member is configured to tilt the scoop from the deployed state to the rest state when the ring gear rotates at the second predetermined speed (i.e. at a speed greater than 1000 rpm). When the ring gear rotates at low speed, the return member is therefore configured to return the scoop from the rest state to the deployed state.

According to another embodiment, the ring gear has a flange extending radially outwards, and each scoop is movably mounted on the flange by means of a connecting piece comprising an opening into which the scoop is inserted.

According to another embodiment, the lubricant recovery pipe extends along the axis X on one side of a plane passing through the flange and perpendicular to the axis X.

According to another embodiment, the scoops are arranged radially outside the delivery channel of the lubricant.

According to another embodiment, the balancing member of the scoop extends radially outwardly of the opening of the piece when the scoop is in its rest state, and the balancing member of the scoop extends radially inwardly of the opening of the piece when the scoop is in its deployed state.

The disclosure also relates to an assembly containing a fan shaft extending along an axis X of rotation, a power shaft, such as a low-pressure shaft, extending along the axis X and intended to rotate the fan shaft along the axis X, and a speed reducer according to one of the aforementioned embodiments, which is mounted between the fan shaft and the power shaft, the power shaft being connected to the central sun gear and the ring gear being coupled to the fan shaft.

The disclosure also relates to a double-flow turbomachine, in particular of an aircraft, comprising an assembly comprising a speed reducer according to the disclosure.

DESCRIPTION OF THE DRAWINGS

The disclosure will be better understood and other details, characteristics and advantages of the present disclosure will become clearer from the following description made by way of non-limiting example and with reference to the attached drawings, in which:

FIG. 6b is a partial schematic side view of the pipe of FIG. 6a;

FIG. 7b is a schematic front view of the scoop of the reducer shown in FIG. 7a;

DETAILED DESCRIPTION

By convention in this application, the terms "inner" and "outer", and "internal" and "external" are defined radially with respect to the axis X of the aircraft engine. Thus, a cylinder extending along the axis X of the engine comprises an inner surface face facing the axis of the engine and an outer surface opposite its inner surface. By "Axial" or "axially" is meant any direction parallel to the axis X, and "transversely" or "transversal" is meant any direction perpendicular to the axis X. Similarly, the terms "upstream" and "downstream" are defined in relation to the flow direction of the air in the turbomachine.

Figure 1:
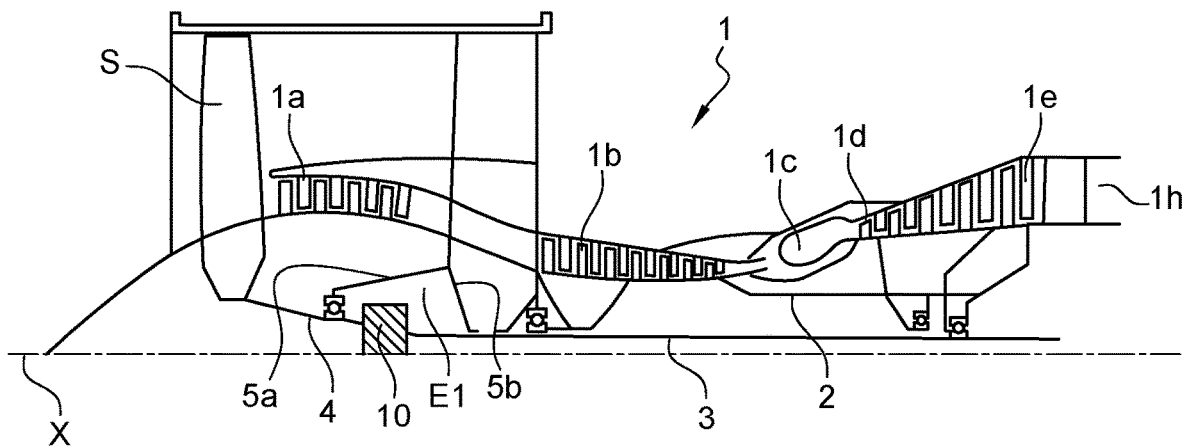
FIG. 1 is a schematic half view in axial section of a turbomachine comprising a fan module using the disclosure.

FIG. 1 describes a turbomachine 1 which conventionally comprises, a propeller or a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) spool. The low-pressure compressor 1a and the low-pressure turbine 1e are connected by a low-pressure shaft 3 and together they form a low-pressure (LP) spool.

The fan S is driven by a fan shaft 4 which is coupled to the LP shaft 3 by means of a speed reducer 10. In this embodiment, the reducer 10 is of the "planetary gear" type shown schematically here.

The reducer 10 is positioned in a front part of the turbomachine. A stationary structure of the turbomachine comprising schematically, here, an upstream part 5a and a downstream part 5b is arranged so as to form an enclosure E1 surrounding the reducer 10.

This enclosure E1 can be closed upstream by seals at the level of a bearing allowing the passage of the fan shaft 4, and downstream by seals at the level of the passage of the LP shaft 3.

Figure 2:
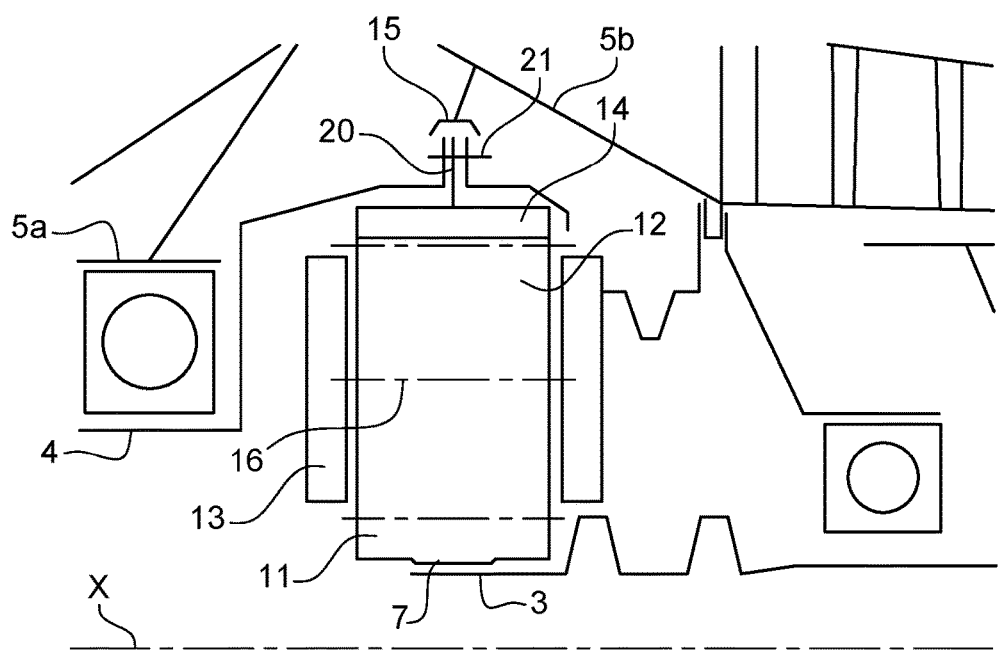
FIG. 2 is a schematic half view in axial section of a speed reducer according to the disclosure.

FIG. 2 shows the positioning of the reducer 10 which comprises a central sun gear 11, an outer annular ring gear 14, a plurality of planet gears 12 mounted on a planet carrier 13. In the case of the planetary reducer 10, the planet carrier 13 is static for the operation of the gear train. The ring gear 14 is movable and attached on the fan shaft 4 of the upstream part 5a of the stationary structure, at the level of these attachment flanges 20. The ring gear 14 is in fact made in two parts to allow the installation of all the elements constituting the reducer. These two parts are attached to each other by a series of assembling bolts 21, at the level of the flange 20 which extends radially outwards from the ring gear 14. This flange 20 may allow the attachment of a protective cover. This protective cover extends at least partly circumferentially and downstream of the flange 20 of the ring gear 14, so as to prevent the projection of the lubricant towards the downstream part 5b of the stationary structure.

The reducer 10 engages, on the one hand, to the splines 7 of the LP shaft 3 by means of the gear pinions of the sun gear 11 of the planetary gear and, on the other hand, to the fan shaft 4 which is connected to the ring gear 14 of the same planetary gear. Classically, the sun gear 11, whose axis of rotation X is coincident here with that of the turbomachine, drives a series of pinions of planet gears or planet gears 12, which are evenly distributed over the circumference of the reducer 10. The number of planet gears 12 is generally defined as between three and seven. The planet gears 12 rotate about their axes of revolution and by engaging with internal toothings of the ring gear 14. Each of the planet gears 12 rotates freely about a planet gear axis 16 connected to a stationary planet carrier 13. The rotation of the planet gears 12 about their planet gear axis 16, due to the cooperation of their pinions with the internal toothings of the ring gear 14, causes the ring gear 14 to rotate about the axis X, while the planet carrier 13 remains stationary. The rotation of the ring gear 14 also drives the rotation of the fan shaft 4 connected to it, at a speed of rotation which is lower than that of the LP shaft 3.

According to an example of an embodiment, the planet gears 12 are held in place by the planet carrier 13 by a series of centering fingers (not shown), evenly distributed around the circumference of the planet carrier and which can extend radially around the sun gear. Of course, there are other technologies for holding the planet gears on the planet carrier.

Figure 3:
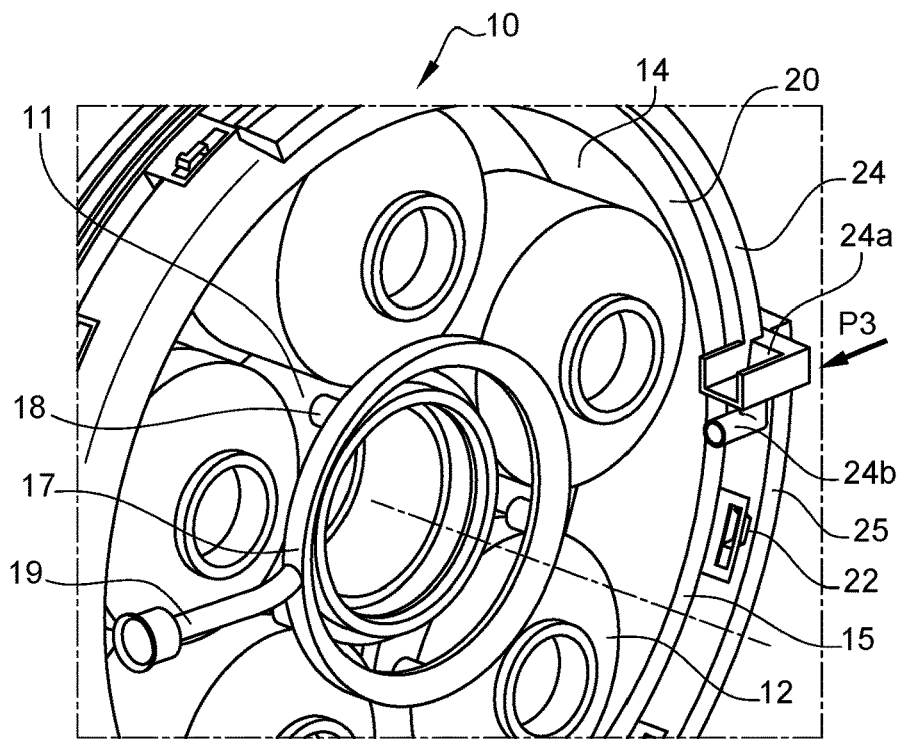
FIG. 3 is a partial schematic perspective view of an example of a planetary reducer according to an embodiment of the disclosure.
Figure 4:
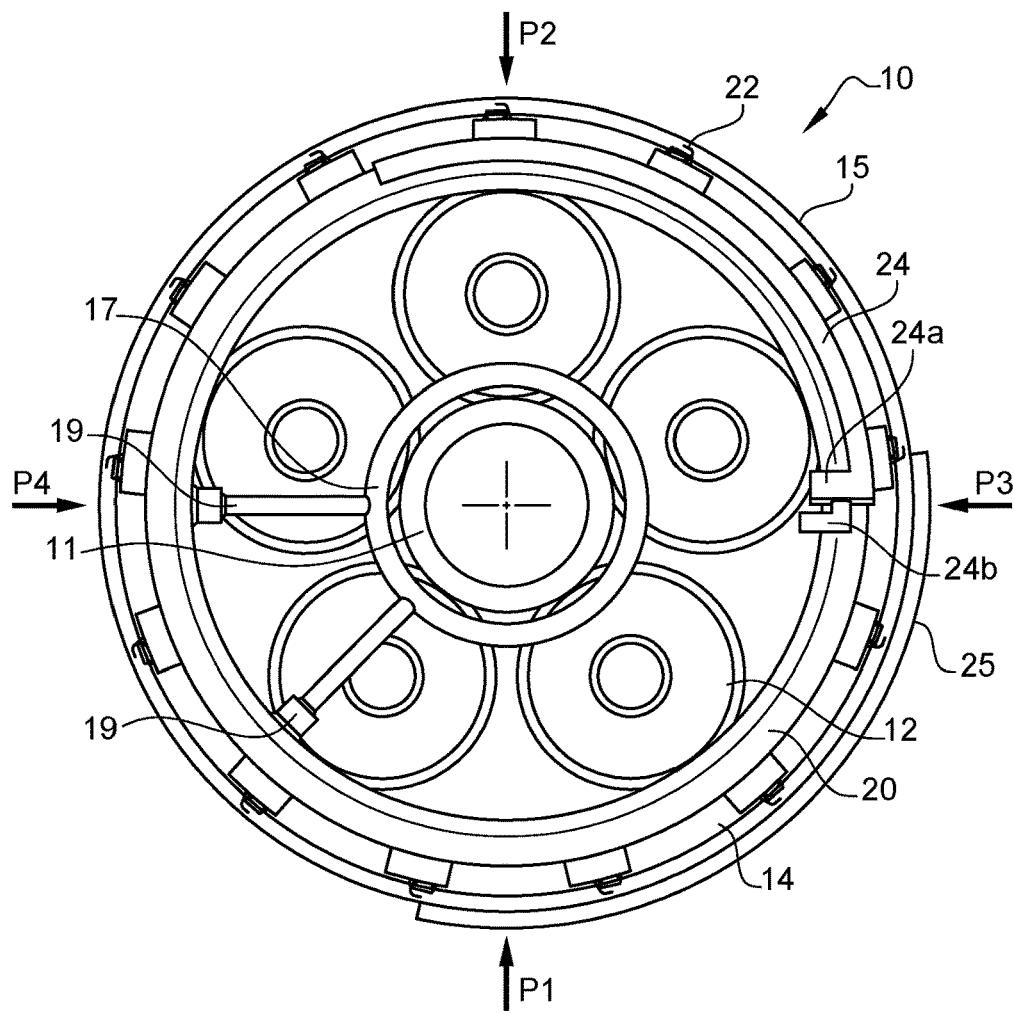
FIG. 4 is a schematic front view of the reducer in FIG. 3.

FIGS. 3 and 4 show a planetary reducer 10 comprising a lubricant supply device 17 (which is generally oil) which may be configured to form a main lubrication circuit for the reducer 10. This device 17 is in the general form of a circular tube 17 extending around the sun gear 11 and forming a lubricant supply pipeline. The circular tube 17 of the device comprises at least one conduit 19 terminating in an open end for allowing the connection to a lubricant supply source. Preferably, the supply device comprises two conduits 19 which are connected to the circular tube 17, as shown for example in FIG. 4. This tube 17 further comprises cannulas 18 arranged at the level of the planet gears 12 to lubricate the gears around the entire circumference of the reducer. Preferably, the cannulas 18 are equal in number to the planet gears 12.

In the case of high speed operation of the turbomachine (i.e. the case of the main lubrication circuit), the circular tube 17 is configured to deliver lubricant under pressure at the level of the cannulae 18 (not shown), so as to lubricate the gears between the sun gear 11 and the planet gears 12 and between the planet gears 12 and the ring gear 14. Likewise, the pressurized lubricant reaches the center of each of the planet gears 12, so as to lubricate the bearings of each planet gear 12.

The speed reducer comprises a device for recovering the oil discharged by centrifugation. The recovery device comprises a collection gutter 15 of the lubricant which is arranged around the ring gear 14. The gutter is connected to the upstream part 5a of the stationary structure of the turbomachine. The rotation of the ring gear 14 allows the lubricant to be discharged by centrifugation towards the gutter 15. This gutter 15 has a generally annular shape for collecting the lubricant. A radial gap is left circumferentially between the ring gear 14 and the gutter 15 to allow in particular the projection and the circulation of the lubricant by centrifugation. The gutter is arranged radially opposite the flange 20.

In the case of operation at a first predetermined speed, i.e. at a low speed (for example, at the maximum WindMilling speed of approximately 1000 rpm), when the turbomachine is stopped or started, the lubricant typically accumulates and stagnates in a bottom of the gutter, representing a first position P1 of the reducer. Thus, as described earlier in the technical background, the main lubrication circuit (operating in particular at high speed) does not allow to lubricate the components of the speed reducer at low operating speed.

In FIGS. 3 and 4 the recovery device of the lubricant (or auxiliary lubrication) is adapted to operate in the case of high speed operation of the turbomachine (in particular when the scoop is in the rest state), and also in the case of low speed operation of the turbomachine, such as at standstill, at start-up and in WindMilling (in particular when the scoop is in the deployed state). This recovery device comprises a delivery channel 24 of the lubricant and a lubricant recovery pipe 25 forming a collection tank of the lubricant. This recovery device further comprises scoops 22 movable between a rest state and a deployed state.

Figure 6A:
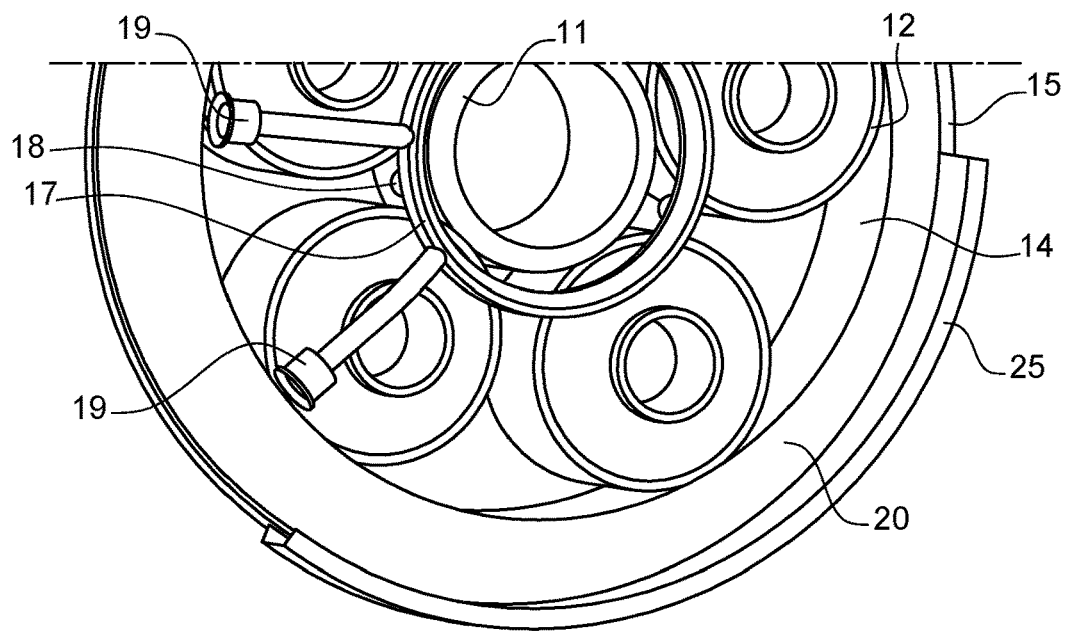
FIG. 6a is a partial schematic perspective view of a recovery pipe of the lubricant of the reducer of FIG. 3.
Figure 6B:
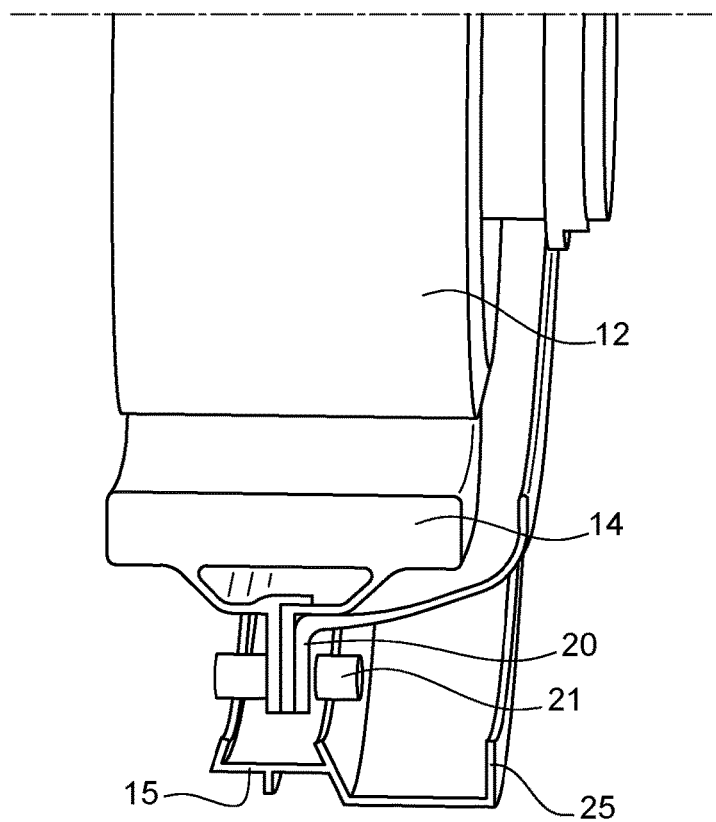

FIGS. 6a and 6b show the recovery pipe 25 of the lubricant which is carried by the gutter 15. The pipe can be formed in one piece with the gutter or can be fitted and attached to the gutter. The pipe is arranged in the lower part of the speed reducer (i.e., at 6 o'clock). In the example and not limited to, the pipe 25 has a general half-arc shape that extends substantially between at least a fourth position P4 (9 o'clock) and a third position P3 (3 o'clock) of the reducer. The oil coming out of the gears and the bearings of the reducer is collected by the gutter 15, then stored in the pipe 25, preferably in the first position P1, so that it can be redirect into the reducer. As illustrated in FIG. 6b, the pipe 25 extends axially from a wall of the legs shaped like a U of the gutter 15. In particular, the pipe 25 extends to one side of a plane passing through the flange 20 of the ring gear and preferably downstream of the speed reducer. The gutter 15 and the pipe 25 are in fluid communication, preferably at the level of the first position P1. For example, at least one opening, one notch, or one cannula is formed between the gutter and the pipe for allowing the lubricant to flow from the gutter into the reservoir pipe. This pipe 25 extends at least between a third position P3 and a fourth position P4 to optimally collect the lubricant from the gears of the reducer. In FIG. 4, the pipe 25 extends substantially between the third position P3 (3 o'clock) and the first position P1 (6 o'clock).

Figure 5:
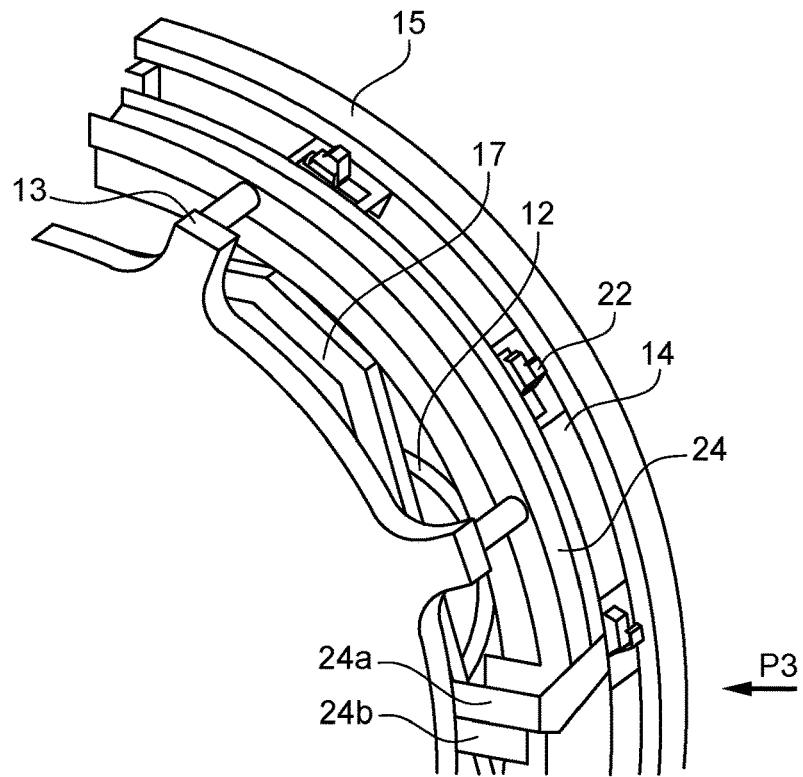
FIG. 5 is a partial schematic perspective view of a delivery channel of the lubricant of the reducer of FIG. 3.

FIGS. 3 to 5 also show an example of the channel 24 for delivering the lubricant collected by the scoops 22. This channel 24 is carried by the planet carrier (FIG. 5). This one is therefore stationary. This channel 24 has a general half-arc shape that extends substantially at least partly circumferentially of the ring gear 14 between the first position P1 and the second position P2 of the reducer. In the example and in a non-limiting way, the channel 24 extends substantially between the second position P2 (12 o'clock) and the third position P3 (3 o'clock). Thus, the lubricant recovered by the scoops 22 of the pipe 25 is re-injected or poured over the entire circumferential length of the channel 24. The lubricant flows through the channel 24 to open into a distribution member 24a, the calibrated end of which is constricted to form an injector 24b. The lubricant exits the injector 24b, for example in the form of a pressure-less flow of the lubricant or of a jet, which is directed towards the planet gears 12 and/or sun gear 11, as shown in FIG. 3.

Figure 7A:
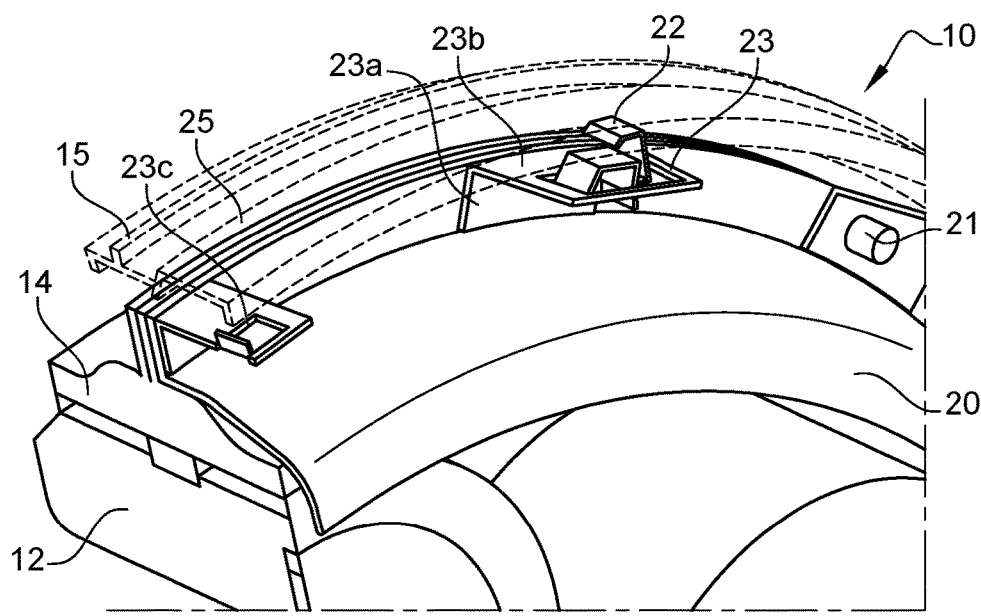
FIG. 7a is a partial schematic perspective view of the scoop of the reducer of FIG. 3.
Figure 7B:
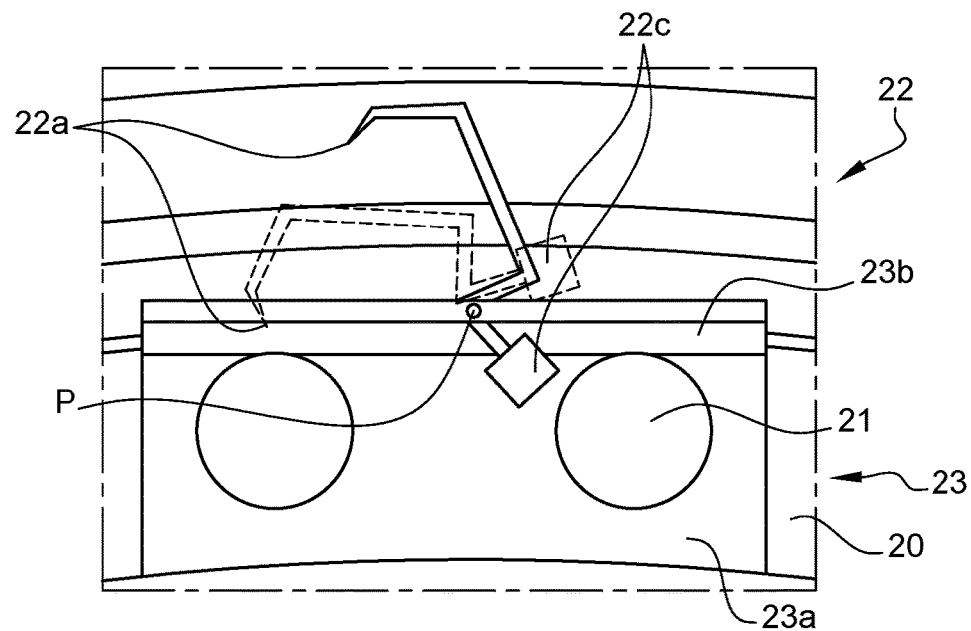
Figure 7C:
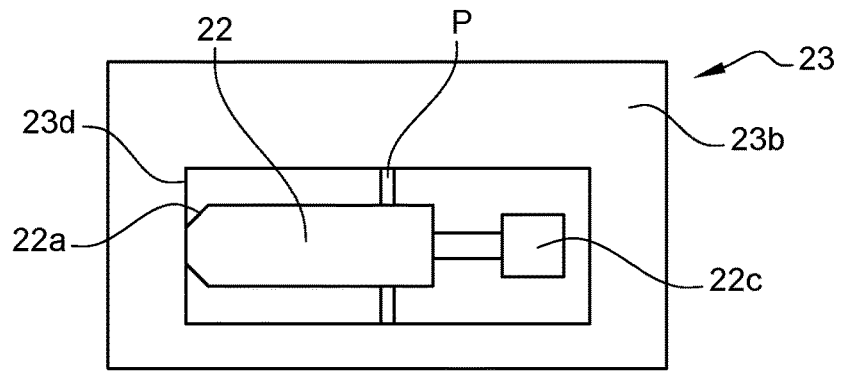
FIG. 7c is a schematic top view of the scoop of the reducer mounted on a connecting piece and shown in FIG. 7a or FIG. 7b.

FIGS. 7a to 7c illustrate scoops 22 of the recovery device of the lubricant. These scoops are connected at the level of the flange 20 of the ring gear 14. For this purpose, a connecting piece 23 is mounted on the ring gear 14 and receives at least one scoop 22. Preferably, the scoop 22 is movably mounted by means of a pivot P on the connecting piece 23. The scoops can be assembled with the connecting piece 23 by means of attachment 21, of the bolt 21 type, on the flange 20 of the ring gear 14. The connecting piece 23 is generally L-shaped, a first part 23a of which, extending radially, is attached to the flange 20 and a second part 23b of which, extending axially from the flange 20. This second part 23b comprises an opening 23c in which at least one scoop 22 is housed.

In FIGS. 7b and 7c, each scoop 22 comprises a first portion 22a having a generally hollow shape to be able to contain the lubricant recovered from the bottom of the pipe 25. This first portion 22a comprises a substantially curved end forming a stop at the level of an edge 23d of the opening 23c of the piece 23. This allows to limit the tilting of the scoop to the opening of the connecting piece. The scoop comprises a pivot axis P arranged substantially between the first portion 22a and a second portion which is opposite to this first portion 22a. This scoop 22 may comprise a return means (not shown) to allow for its deployed state. For example, but not limited to, one returning means of the scoop 22 is a spring. The scoop 22 may further comprise a balancing member 22c, located substantially at the level of the second end, which counterbalances the return force of the return means. For example, and without limitation, a balancing member 22c is a weight or a counterweight or any other member allowing the scoop to tilt between these two states of rest and deployment.

During high speed operation of the turbomachine (i.e. above 1000 rpm), the scoops 22 are tilted to a rest state, in which each scoop 22 is inclined towards the ring gear 14. In particular, the abutting end of the first portion 22a of the scoop 22 lies in a general direction substantially parallel to the second part 22b of the connecting piece 23. In the rest state, the scoops 22a allow the lubricant to circulate by centrifugation through and along the pipe 25 to discharge the lubricant discharged from the gears of the reducer. Indeed, the balancing member 22c extends radially outwards from the second part 23b of the connecting piece 23, so as to exert a centrifugal force allowing the scoop 22 to be inclined in its rest state when the turbomachine is operating at high speed.

In low speed operation or without operating speed of the turbomachine (less than or equal to 1000 rpm), the movable scoops 22 are tilted into a deployed state, so that each scoop 22 is straightened towards the gutter 15. In particular, the abutting end of the first portion 22a of the scoop 22 is spaced apart from the opening 23c of the connecting piece 23. This first portion 22a extends substantially transversely with respect to the second part 23b of the piece 23. Indeed, in this deployed state, the balancing member 22c extends inwardly of the connecting piece 23 to straighten the scoop 22. The return means holds the scoop in this deployed position. In this state, the scoops 22 recover the lubricant from the first position P1 of the pipe 25, to reintroduce it by gravity into the channel 24, between the first position P1 and the third position P3, and preferably between the position P3 and the position P2 (following the direction of rotation of the ring gear here). Indeed, the lubricant is discharged from the gears of the reducer into the reservoir pipe 25, due to a closed-circuit operation of the lubricating oil in the reducer, so that the scoops take up the lubricant from the bottom of the pipe. As the fan shaft 4 rotates at low speed, for example due to the wind, the ring gear 14 is also caused to rotate. This may also result in the reintroduction of the lubricant through the scoops 22.

The configuration of the scoops on a rotating or movable member of the speed reducer brings several advantages which are, in particular:
  optimizing the lubrication of the planetary reducer by covering all the operating cases of the turbomachine (at low speed, at standstill, at start-up and in WindMilling);
  redirecting the oil in the same planetary reducer;
  simplifying and uncluttering the mounting and the operation of the planetary reducer; and
  adapting easily to the existing planetary reducers.

This proposed solution is simple, effective and economical to build and assemble on a turbomachine, while ensuring optimal lubrication and service life of the speed reducer.

The invention claimed is:

1. A speed reducer of a turbomachine, comprising a central sun gear mounted to rotate integrally on a power shaft around an axis X of rotation, an annular ring gear coaxial with the axis X, and a plurality of planet gears arranged around the axis X and mounted to be movable on a planet carrier, said planet gears being engaged with said central sun gear and the annular ring gear which extends around the planet gears, the speed reducer further comprising a lubricant recovery device comprising a recovering pipe of lubricant discharged by centrifugation from said speed reducer, said recovery device comprising scoops mounted to pivot about a pivot axis P on a movable member of the speed reducer which rotates around the axis X between a deployed state and a rest state, wherein in the deployed state, the power shaft rotates at a first predetermined speed and each scoop is configured to recover a portion of the lubricant by moving toward the recovering pipe, and in the rest state, the power shaft of the speed reducer rotates at a second predetermined speed greater than said first predetermined speed, and wherein said movable member is the annular ring gear, wherein said lubricant recovery device comprises a gutter which extends radially outwards and at least partly around the annular ring gear, said recovering pipe being carried by the gutter and extending at least partly circumferentially around the axis X.

2. The speed reducer according to claim 1, wherein the speed reducer is a planetary gear, and in that the planet carrier is stationary.

3. The speed reducer according to claim 1, wherein said recovering pipe is in fluid communication with the gutter at the level of a first position situated at the bottom of the speed reducer and remote from the axis X of the speed reducer.

4. The speed reducer according to claim 3, wherein the recovery device further comprises at least one delivering channel of the lubricant which is carried by the planet carrier and which extends, at least partly, circumferentially around the axis X between a second position opposite said first position and a third position arranged between said first and second positions, said channel being configured to receive the lubricant from the scoops and opening to the gears of the speed reducer.

5. The speed reducer according to claim 4, wherein the delivery channel of the lubricant extends, at least partly circumferentially around the axis, between said first position and said second position.

6. The speed reducer according to claim 4, wherein in its deployed state each scoop is configured, on the one hand, to recover the lubricant from said recovering pipe from the first position, and on the other hand, to redirect the recovered lubricant in the delivery channel throughout the third position, towards the second position.

7. The speed reducer according to claim 4, wherein said channel comprises a distribution member comprising an injector and arranged substantially at the level of the third position and remote from the axis X, the injector being configured to inject the lubricant flowing in the channel and discharged by the scoops towards the gears of the speed reducer.

8. The speed reducer according to claim 1, wherein each scoop comprises a balancing member configured to tilt the scoop from the deployed state to the rest state or vice versa under the action of centrifugal force generated during rotation of the axis X, and a return member configured to maintain the scoop in its deployed state.

9. The speed reducer according to claim 1, wherein the annular ring gear has a flange which extends radially outwards, and each scoop is movably mounted on the flange by a connecting piece comprising an opening into which the scoop is inserted.

10. The speed reducer according to claim 9, wherein said balancing member of the scoop extends radially outwardly of the opening of said piece when the scoop is in the rest state, and the balancing member of the scoop extends radially inwardly of the opening of said piece when the scoop is in the deployed state.

11. An assembly containing a fan shaft extending along an axis X of rotation, a power shaft extending along the axis X and intended to rotate the fan shaft along the axis X, and the speed reducer according to claim 1 mounted between the fan shaft and the power shaft, the power shaft being connected to the central sun gear and the annular ring gear being coupled to the fan shaft.

12. A double-flow turbomachine, comprising an assembly as claimed in claim 11.

13. A speed reducer of a turbomachine, comprising a central sun gear mounted to rotate integrally on a power shaft around an axis X of rotation, an annular ring gear coaxial with the axis X, and a plurality of planet gears arranged around the axis X and mounted to be movable on a planet carrier, said planet gears being engaged with said central sun gear and the annular ring gear which extends around the planet gears, the speed reducer further comprising a lubricant recovery device comprising a recovering pipe of lubricant discharged by centrifugation from said speed reducer, said recovery device comprising scoops mounted to pivot about a pivot axis P on a movable member of the speed reducer which rotates around the axis X between a deployed state and a rest state, wherein in the deployed state, the power shaft rotates at a first predetermined speed and each scoop is configured to recover a portion of the lubricant by moving toward the recovering pipe, and in the rest state, the power shaft of the speed reducer rotates at a second predetermined speed greater than said first predetermined speed, and wherein said movable member is the annular ring gear, wherein the annular ring gear has a flange which extends radially outwards, and each scoop is movably mounted on the flange by a connecting piece comprising an opening into which the scoop is inserted.

14. An assembly containing a fan shaft extending along an axis X of rotation, a power shaft extending along the axis X and intended to rotate the fan shaft along the axis X, and the speed reducer according to claim 13 mounted between the fan shaft and the power shaft, the power shaft being connected to the central sun gear and the annular ring gear being coupled to the fan shaft.

15. A double-flow turbomachine, comprising an assembly as claimed in claim 14.

\* \* \* \* \*